Figure 1:
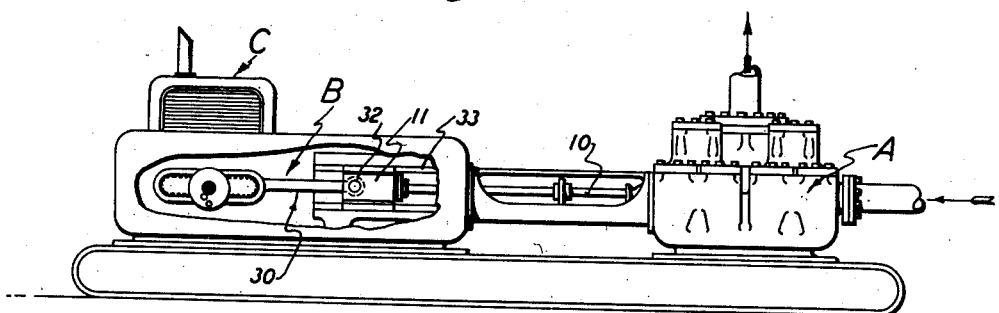

Feb. 4, 1958 — J. C. DUNN — 2,821,861
DRIVE MECHANISM FOR CONVERTING ROTARY
TO RECIPROCATORY MOVEMENT
Filed Jan. 2, 1953

INVENTOR.
JOHN C. DUNN.
BY
Attorney.

United States Patent Office 2,821,861
Patented Feb. 4, 1958

2,821,861
DRIVE MECHANISM FOR CONVERTING ROTARY TO RECIPROCATORY MOVEMENT
John C. Dunn, Anaco, Venezuela
Application January 2, 1953, Serial No. 329,310
5 Claims. (Cl. 74—30)

This invention is concerned with a drive mechanism for converting rotary to reciprocatory movement, and it is a general object of the invention to provide a simple, practical, effective drive of this character, and one which can, in practice, be used to advantage in mechanisms such as pumps, or the like.

There are various situations where it is desired to convert rotary motion, for example, the action of a power driven shaft, to reciprocatory movement, for example, to the piston of a cylinder and piston type pump, or the like. The usual or common mechanism employed for this purpose is of the crank type involving generally, a crank arm rotated by the power driven shaft and a connecting rod coupling the wrist pin of the crank arm and the piston rod or other element of the pump requiring reciprocation. The usual crank mechanism is satisfactory in some cases; however, because of the characteristics of this type of mechanism, there is a variation in speed at which the driven element is operated, and variation in leverage as between the drive and driven elements, which, in many cases, is not altogether desirable, and may even in some instances be highly detrimental or unsatisfactory. For example, in the case where fluids are being handled as by means of a pump driven by a crank, certain undesirable surgings may be set up, and in some cases, where a crank is employed, there is not a desired uniform leverage condition, but, rather, a constantly changing leverage condition.

It is a general object of this invention to provide a drive mechanism for converting rotary to reciprocatory movement, which mechanism is such as to overcome certain of the characteristic difficulties or limitations of a crank mechanism, and is such that it can be used generally, or in various situations where rotary movement is to be converted to reciprocatory movement.

Another object of this invention is to provide a drive mechanism of the character mentioned, which involves few, simple, practical, dependable parts which are combined and related so that the mechanism operates dependably and smoothly.

A further object of this invention is to provide a drive mechanism of the general character referred to that is effective to quickly change or reverse the direction of the driven element and which serves to maintain a uniform or constant leverage relationship as between the drive and driven elements throughout operation of the driven element except at the ends of its stroke where it is reversed as to direction of movement.

It is another object of this invention to provide a drive mechanism of the general character referred to which is such that it can be advantageously embodied in a form which is not only simple, and requiring but few parts, but also compact, making it practical for use in situations where but limited space is available.

It is another object of this invention to provide a drive mechanism of the character referred to, combined with a piston rod of a cylinder and piston type pump, to the end that power from a constantly rotating drive shaft is converted into reciprocatory movement to advantageously operate the piston of the pump.

The drive mechanism of the present invention includes generally, a drive shaft which, in practice, may be driven by a prime mover such as a motor or engine, and may be ordinarily assumed to be driven constantly. A pinion is fixed on the drive shaft and a driven element is cooperatively engaged with the pinion and includes elongate body portions that are spaced apart and curved or arcuate ends which connect corresponding ends of the body portions. The flattened ring-like unit formed by the body portions and ends has the continuous series of gear teeth extending lengthwise of each end at its interior, which series of teeth is engaged by the drive pinion. A guide means maintains the driven element properly and cooperatively related to the pinion and includes a carrier mounted to rotate freely on the axis of the shaft, and a guide member carried by the carrier and engaging an outwardly facing track on the exterior of the driven element. A pilot member is carried by the carrier and engages a track at the interior of the driven element. The pilot member cooperates with the driven element to maintain the guide member in radial alignment with the point of contact between the pinion and driven element relative to the axis of the shaft, thus eliminating binding or tendency to bind as the mechanism operates.

Figure 2:
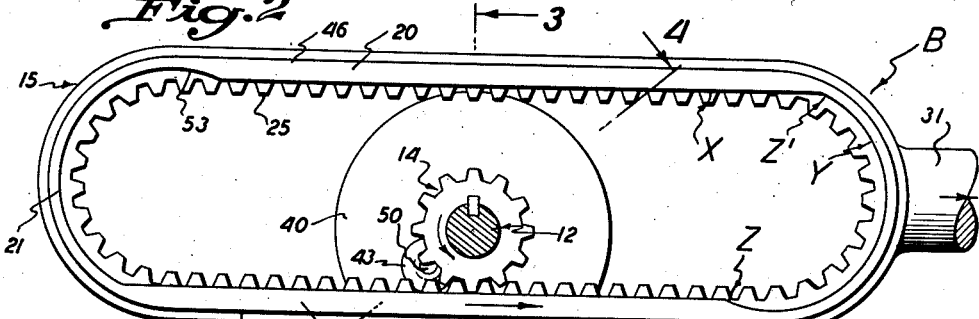
Figure 3:
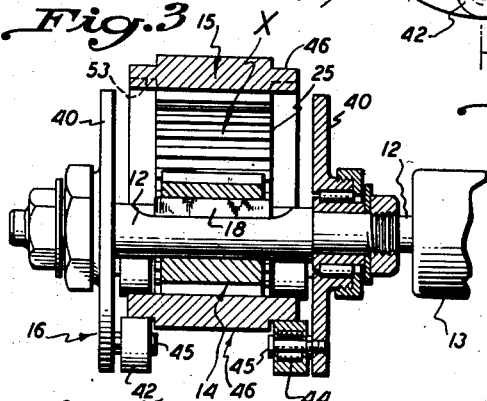
Figure 4:
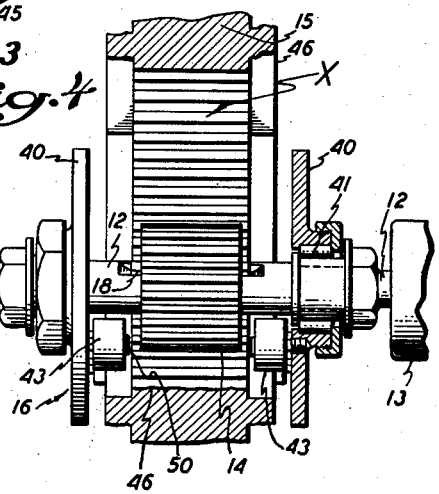

The various objects and features of my invention will be fully understood from the following detailed description of a typical preferred form and application of my invention, throughout which description reference is made to the accompanying drawings, in which:

Fig. 1 is a side elevation of a cylinder and piston type pump showing a drive embodying the present invention. Fig. 2 is an enlarged view illustrating the essential elements of the drive. Fig. 3 is a detailed transverse sectional view taken as indicated by line 3—3 on Fig. 2. Fig. 4 is a detailed transverse sectional view taken as indicated by line 4—4 on Fig. 2, and Figs. 5, 6 and 7 are diagrammatic views of the drive, showing the parts thereof in different working positions.

The drive as provided by the present invention can be used to advantage in various situations, in fact, it is useful generally where it is desired to convert rotary motion to reciprocatory motion. The drive as provided by the present invention is particularly useful and practical in a situation such as occurs in or as part of a slush pump, or the like, and therefore the drive is being here illustrated as incorporated in or as a part of a slush pump. The particular pump illustrated in the drawings includes a fluid handling mechanism A of the cylinder and piston type, and the piston rod 10 of the fluid handling mechanism is suitably coupled with the cross head 11 of the drive B provided by the present invention. The drive B as provided by the present invention is shown operated by a prime mover in the form of an engine unit C, and the shaft 12 of the drive B is adapted to be driven by the engine C, and it serves to convert the rotary motion applied to the shaft or gained from the action of the engine to the piston rod 10 to effect reciprocation thereof.

The drive as provided by the present invention includes generally, the drive shaft 12 suitably supported in bearings 13 so that it rotates about a fixed axis. A pinion 14 is carried by or fixed on the shaft 12 and is engaged by and drives a driven element 15. A guide means 16 connects or is related to the elements just described, and serves to maintain the driven element 15 in the proper cooperative relation to the pinion 14 on the drive shaft 12.

The drive shaft 12 may be considered as carried by suitable bearings 13, and, in practice, can be suitably connected to or coupled with engine C so that it is rotatable about a fixed axis, say, for example, a horizontal axis as shown throughout the drawings. For the purpose of example, the shaft 12 may be considered as being consequently operated or rotated by means of engine C.

The pinion 14 may, in practice, be an ordinary pinion fixed on the shaft 12 and having teeth of the simple or common spur gear type. In the case illustrated, the pinion is shown fixed on the shaft by means of a key 18.

The driven element 15, best shown in Fig. 2 of the drawings, is a rigid unitary element preferably integral in construction and it is characterized by spaced elongate body portions 20 and end portions 21 which are curved or arcuate in form, and which connect corresponding ends of the body portions 20. In a typical form of the invention, the body portions 20 are simple, straight, elongate members and end portions 21 are curved or arcuate members, each curved about a given center, the terminal ends of the body portions being joined to or connected to the ends of the end portions 21 to be, in effect, continuous therewith, to the end that the driven element 15 is, in effect, a flattened loop-shaped member as clearly illustrated in Fig. 2 of the drawings. In the particular case illustrated, both of the body portions 20 are straight from one end to the other, and the two end portions 21 are of equal curvature or radius, and are of equal extent, so that the body portions 20 are parallel with each other and of equal length as clearly illustrated in Fig. 2 of the drawings. It is to be understood that the present invention may be carried out by making one of the end portions 21 of greater radius or extent than the other, in which case, the body portions 20 will not be parallel with each other as shown in the drawings, but would be angularly related or converging. Likewise, it is to be understood that if desired, to gain a particular speed ratio or character of drive, the body portions 20 shown straight in the drawings may be curved or arcuate or made other than straight, as circumstances may require. For ordinary use and in most instances, however, it is preferred that the end portions 21 be equal or like, as shown in the drawings, and it is preferred that the body portions 20 be straight, as shown in the drawings.

A feature of the driven element 15, the general form of which has been described, is the provision of a series of teeth on the driven element at the interior thereof. As shown in the drawings, a series of teeth 25 is provided at the interior of the driven element, extending continuously around the interior of element 15 so that there is a straight rack-like portion at the inner side of each body portion, and a curved portion in the nature of an internal gear at the inner sides of the end portion 21.

Figure 5:
Figure 6:
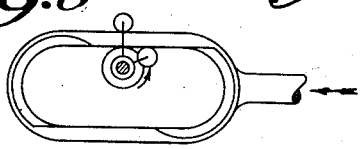
Figure 7:
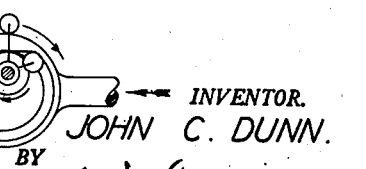

In accordance with the present invention, the driven element 15 is adapted to be maintained in cooperative engagement with the pinion 14 on shaft 12, so that the teeth of the pinion are maintained in cooperative engagement with the teeth 25 in the element 15, and in accordance with the general relationship of parts provided by the invention, the end portions 21 of element 15 are of greater radius than the pinion 14, so that the pinion and driven element cooperate and work relative to each other through positions such as shown in Figs. 5, 6 and 7 of the drawings, all to the end that, as the drive shaft 12 is rotated, the cross head 11 joined to the element 15 by coupling means 30 is reciprocated.

The coupling means 30 illustrated in the drawings is formed by a simple, straight, rigid connecting rod 31 having one end fixed to the element 15, preferably at one end thereof, and having its other end pivotally connected to the cross head 11 as by means of a pivot pin 32. The cross head 11 as shown in the drawings may be slidably mounted in a suitable guide 33, which is a part of the frame of the pump construction or which is otherwise suitably mounted so that it is stationary, and parallel with the element 10 that is to be reciprocated.

The guide means 16 as provided by the present invention relating the pinion 14 and the driven element 15 may, in practice, include like mechanisms at each side of the assembly formed by the pinion and driven element, in which case the said mechanisms are preferably alike and are oppositely opposed, as shown in the drawings. Since the units or mechanisms of means 16 are alike, the following description of but one of these mechanisms is to be understood as being applicable to both.

The mechanism of means 16 includes generally, a carrier 40 rotatably mounted concentric with the assembled pinion and driven element at one side of that assembly. In the particular case illustrated, the carrier 40 is shown mounted by means of an anti-friction bearing 41 so that it is concentric with shaft 12 and so that it is suitably spaced from the assembled pinion and driven element. The mechanism of means C further includes a guide member 42 mounted on or carried by the carrier 40 and a pilot member 43 likewise mounted on or carried by the carrier 40.

The guide member 42 is preferably in the form of a roller suitably mounted as by means of an anti-friction bearing 44 on a bearing member or pin 45 projecting from the side of the carrier 40 opposing the assembled pinion and driven element. The guide roller 42 is thus rotatably supported on an axis parallel with and spaced from that of the shaft 12 and it is supported in a position to engage or work along a track 46 provided on the driven element 15. In accordance with the present invention the track 46 is a loop-shaped track parallel with and outward of the series of teeth 25 of element 15, as shown clearly in Fig. 2 of the drawings. The axis of the guide roller 42 is so spaced from the axis of shaft 12 that when the roller 42 is engaged with the track 46, the pinion 14 is in the proper and desired driving engagement with, or relationship to, the teeth 25 of the driven element 15. In other words, the relationship of parts is such that the desired driving engagement occurs between the pinion and the driven element when the point of engagement between the teeth of the pinion and the driven element coincides with a line extending radially from shaft 12 and through the axis of the guide roller 42. With this relationship of parts the structure may under certain ideal conditions work satisfactorily. However, there is a marked tendency for the engagement of the teeth and the axis of the guide roller to become misaligned or in other words, there may be a tendency for the guide roller 42 to drag, with consequent excess pressure occurring or developing between the engaged gear parts, and consequently a tendency for the mechanism to bind. This is particularly true as the mechanism reaches or operates through positions as are shown or indicated in Fig. 7 of the drawings.

The pilot member 43 is provided to overcome the tendency for pressure or binding to occur, and in the preferred form of the invention, the pilot member 43 is in the form of a roller mounted on a pivot pin 50 projecting from carrier 40 and it is preferably mounted through or by means of a suitable anti-friction bearing. The pilot roller 43 is mounted on an axis parallel with that of the shaft 12 and the guide roller 42, the axis of the pilot roller being laterally offset or spaced from the radial line in which it is preferred to maintain the axis of roller 42 and the point of engagement occurring between the teeth of the pinion and driven element 15. The pilot roller 43 engages and cooperates with a track 53 provided on the drive element 15. The track 53 is formed or provided on the element 15 to extend lengthwise of the series of teeth 25, or, in other words, it is a continuous loop-shaped track and it has straight portions X extending longitudinally of the body portions 20 parallel with the rack-like portions of the series of teeth 25, and it has curved or arcuate end portions Y occurring at the curved end portions 21 of element 15, and shaped as illustrated in Fig. 2 of the drawings. The parts are related as shown in the drawings, so that the guide roller 43 is spaced from the axis through the point of gear engagement and the axis of roller 42 in the direction from which the part of the element 15 engaged by the pinion is advanced or driven. In the form of the invention shown, the straight portions X of track 53 are located about at the roots of the teeth occurring at the rack portions of the series of teeth 25, and the curved end portions Y of the track 53 are concentric with the curved portions of the series of teeth occurring at the end portions 21 and are somewhat outward of the roots of the teeth occurring at the end portions 21, as clearly shown in Fig. 2. As a result of this formation of track 53, as the driven element 15 is engaged by the pinion which is turning counter-clockwise so that the element 15 is moved to the right, when the parts reach the position where is to be a chance of direction of movement, the curved end 21 at the left hand end of the element 15 reaches the pinion at the time that the guide roller 42 reaches the point where it is to proceed around the left hand portion 21 and at that time the pilot roller 43 reaches the point Z' where it proceeds into what may be termed the enlarged curved end portion Y of track 53. From this point on, there is a rocking or turning movement of the carrier 40 in the course of which the driven element 15 moves or rocks about the axis of pin 32 at the cross head 11 until the left hand end of the upper body portion 15 reaches engagement with the pinion 14, at which time the guide roller 42 reaches the right hand end of the straight rail portion 46 on the top body portion 20, and at this time the pilot roller 43 reaches the point Z where the curved or enlarged rail portion Y joins the straight rail portion X of the top body portion 20. In the course of this operation, the driven element 15 will have been rocked and the direction of movement reversed so that as the pinion continues to rotate, the driven element 15 will be moved to the left until the end portion 21 at the right of element 15 reaches the pinion, whereupon there will be a similar rocking and reversal of element 15. Throughout the rocking and reversal of element 15 at each end of the movement of element 15, the desired engagement is maintained between the gears or between the tooth members.

From the foregoing description it will be apparent that with the mechanism of the present invention the drive pinion 14 is maintained in constant geared or driving relation with the element 15 and that the structure is such that reversal of the direction of movement of element 15 occurs rapidly at each end of the stroke, and during the major portion of each stroke there is a uniform or constant rate of movement of the element 15 and a corresponding constant leverage relationship between the pinion and element 15.

Throughout the foregoing description, the structure has been referred to as a drive adapted to convert rotary to reciprocatory movement. It is to be recognized that the action may be reversed, if desired, in which case the structure will serve to convert reciprocatory movement to rotary movement. In such case, it may, in practice, be desirable to vary the proportioning of parts or to otherwise adapt the design to the desired action. In view of the foregoing, it is to be understood that the invention is not to be considered or interpreted in a limited sense, but it is to be considered as workable in either manner above pointed out; and in the claims, where the term "drive" is used and where the term "driven" is used, these terms—or comparable terms—may or are to be used alternately, depending upon the direction or manner in which the structure is operated.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A drive including, a single drive pinion mounted for rotation about a fixed axis, a driven element in the form of a flattened loop and having a continuous series of teeth at its interior, and guide means coupling the pinion and said element with the pinion engaged with the teeth, the guide means including a carrier pivotally mounted concentric with the pinion, a guide member carried by the carrier and cooperatively engaged with said element, and a pilot member carried by the carrier in fixed relation to the guide member and drive pinion and cooperatively engaged with said element, whereby the driven element is rocked and reciprocated as the pinion is rotated.

2. A drive including, a single drive pinion mounted for rotation about a fixed axis, a driven element in the form of a flattened loop and having a continuous series of teeth at its interior, and guide means coupling the pinion and said element with the pinion engaged with the teeth, the guide means including a carrier pivotally mounted concentric with the pinion, a guide member carried by the carrier and cooperatively engaged with said element, and a pilot member carried by the carrier in fixed relation to the guide member and drive pinion and cooperatively engaged with said element, said guide member being on an axis laterally offset from that of the pinion, whereby the driven element is rocked and reciprocated as the pinion is rotated and at the exterior of the driven element.

3. A drive including, a single drive pinion mounted for rotation about a fixed axis, a driven element in the form of a flattened loop and having a continuous series of teeth at its interior, and guide means coupling the pinion and said element with the pinion engaged with the teeth, the guide means including a carrier pivotally mounted concentric with the pinion, a guide member carried by the carrier and cooperatively engaged with said element, and a pilot member carried by the carrier in fixed relation to the guide member and drive pinion and cooperatively engaged with said element, the said guide member and the point of engagement between the pinion and the series of teeth being in line radially of the pinion and the pilot member being laterally spaced from such radial line, whereby the driven element is rocked and reciprocated as the pinion is rotated.

4. A drive including, a single drive pinion mounted for rotation about a fixed axis, a driven element in the form of a flattened loop and having a continuous series of teeth at its interior, and guide means coupling the pinion and said element with the pinion engaged with the teeth, the guide means including a carrier pivotally mounted concentric with the pinion, a guide member carried by the carrier and cooperatively engaged with said element, and a pilot member carried by the carrier in fixed relation to the guide member and drive pinion and cooperatively engaged with said element, said members being rollers on axes parallel with that of the pinion and the guide member, the point of engagement between the pinion and the series of teeth being in line radially of the pinion and the pilot member being laterally spaced from such radial line.

5. A drive including, a single drive pinion mounted for rotation about a fixed axis, a driven element in the form of a flattened loop and having a continuous series of teeth at its interior, and guide means coupling the pinion and said element with the pinion engaged with the teeth, the guide means including a carrier pivotally mounted concentric with the pinion, a guide member carried by the carrier and cooperatively engaged with said element, and a pilot member carried by the carrier in fixed relation to the guide member and drive pinion and cooperatively engaged with said element, the said element having an outwardly facing track thereon engaged by the pilot member and having an inwardly facing track engaged by the guide member, whereby the driven element is rocked and reciprocated as the pinion is rotated.

References Cited in the file of this patent

UNITED STATES PATENTS

| Number | Name | Date |
| --- | --- | --- |
| 669,379 | Baughman | Mar. 5, 1901 |
| 680,765 | Cottrell | Aug. 20, 1901 |
| 1,784,842 | Lemons | Dec. 16, 1930 |
| 1,917,201 | Bornstein | July 4, 1933 |
| 2,136,478 | Travis | Nov. 15, 1938 |
| 2,200,292 | Patterson | May 14, 1940 |
| 2,244,607 | Blakeley | June 3, 1941 |